United States Patent
Ren et al.

(10) Patent No.: US 10,080,007 B2
(45) Date of Patent: *Sep. 18, 2018

(54) HYBRID TILING STRATEGY FOR SEMI-GLOBAL MATCHING STEREO HARDWARE ACCELERATION

(71) Applicant: TEXAS INSTRUMENTS INCORPORATED, Dallas, TX (US)

(72) Inventors: Jing-Fei Ren, Plano, TX (US); Darnell Moore, Allen, TX (US); Do-Kyoung Kwon, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 197 days.

This patent is subject to a terminal disclaimer.

(21) Appl. No.: 15/073,078

(22) Filed: Mar. 17, 2016

(65) Prior Publication Data
US 2017/0272723 A1  Sep. 21, 2017

(51) Int. Cl.
*G06K 9/00* (2006.01)
*H04N 13/128* (2018.01)
(Continued)

(52) U.S. Cl.
CPC ......... *H04N 13/128* (2018.05); *G06T 7/0075* (2013.01); *H04N 13/0022* (2013.01);
(Continued)

(58) Field of Classification Search
CPC ........ H04N 13/0022; H04N 2013/0081; G06T 7/0075; G06T 2207/10012
See application file for complete search history.

(56) References Cited

U.S. PATENT DOCUMENTS 8,488,870 B2 * 7/2013 Martinez-Bauza ........................ H04N 13/0271
345/427
8,538,159 B2 * 9/2013 Lu ............................ G06K 9/32
382/154

(Continued)

OTHER PUBLICATIONS

Pei et al, "Design of FIR Bilevel Laplacian-of-Gaussian Filter," Signal Processing 82 (2002) pp. 677-691.
(Continued)

*Primary Examiner* — Gregory M Desire
(74) *Attorney, Agent, or Firm* — Kenneth Liu; Charles A. Brill; Frank D. Cimino

(57) ABSTRACT

Apparatus and methods for disparity cost computation for a stereoscopic image. In an example, a method includes computing partial path matching costs for multiple disparities of pixels of multiple parallelogram blocks of an image in a forward pass direction. Between computing the partial path matching costs of the pixels of adjacent parallelogram blocks, the method includes computing partial path matching costs for the plurality of disparities of pixels along a boundary edge of a corresponding rectangular tile using paths that are external to the rectangular tile and computing partial path matching costs the disparities for all of the pixels of the corresponding rectangular tile. The method also includes computing total aggregated disparity costs for each disparity of the pixels of the image using the partial path matching costs computed for the pixels in the parallelogram blocks and in the rectangular tiles.

20 Claims, 4 Drawing Sheets

(51) Int. Cl.
*H04N 13/00* (2018.01)
*G06T 7/00* (2017.01)

(52) U.S. Cl.
CPC ............. *G06T 2207/10012* (2013.01); *H04N 2013/0081* (2013.01)

(56) References Cited

U.S. PATENT DOCUMENTS

| | | | | |
|---|---|---|---|---|
| 9,020,242 B2* | 4/2015 | Bingrong | ................. | G06T 7/55 382/154 |
| 9,104,904 B2* | 8/2015 | Cheng | ................. | G06K 9/00201 |
| 9,361,699 B2* | 6/2016 | Liao | ...................... | G06T 7/0075 |
| 9,524,556 B2* | 12/2016 | Uliyar | .................. | G06T 7/0055 |
| 9,704,250 B1* | 7/2017 | Shah | ..................... | G06T 7/0065 |
| 2013/0083994 A1 | 4/2013 | Ren et al. | | |
| 2013/0208975 A1* | 8/2013 | Hsu | ...................... | G06T 7/0075 382/154 |
| 2014/0254918 A1* | 9/2014 | Cheng | ................. | G06K 9/00201 382/154 |
| 2017/0272723 A1* | 9/2017 | Ren | ..................... | H04N 13/0022 |

OTHER PUBLICATIONS

Mroz et al., "An Empirical Comparison of Real-Time Dense Stereo Approaches for use in the Automotive Environment," EURASIP Journal on Image and Video Processing 2012, 2012:13, 19 p.

Marr et al., "Theory of Edge Detection," Proceedings of the Royal Society of London, Series B, Biological Sciences, vol. 207, No. 1167. (Feb. 29, 1980), pp. 187-217.

Hirschmüller, Heiko, "Accurate and Efficient Stereo Processing by Semi-Global Matching and Mutual Information," IEEE Conference on Computer Vision and Pattern Recognition (CVPR), San Diego, CA, USA, Jun. 20-26, 2005, 8 p.

Hirschmüller, Heiko, "Stereo Processing by Semiglobal Matching and Mutural Information," IEEE Transactions on Pattern Analysis and Machine Intelligence, vol. 30, No. 2, Feb. 2008, 14 p.

* cited by examiner

HYBRID TILING STRATEGY FOR SEMI-GLOBAL MATCHING STEREO HARDWARE ACCELERATION

BACKGROUND

Objects at different depths in the scene of a stereoscopic video sequence will have different displacements, i.e., disparities, in left and right frames of the stereoscopic video sequence, thus creating a sense of depth when the stereoscopic images are viewed on a stereoscopic display. The term disparity refers to the shift that occurs at each pixel in a frame between the left and right images due the different perspectives of the cameras used to capture the two images. The amount of shift or disparity may vary from pixel to pixel depending on the depth of the corresponding 3D point in the scene.

In many stereo vision applications, it is important to know the depths of objects in a scene. The depth information for a stereo frame or image is typically computed from the disparities between the pixels in the left image and corresponding pixels in the right image because depth is proportional to the reciprocal of the disparity. One technique used for disparity determination that may be used in stereo vision applications is the semi-global matching (SGM) technique described in H. Hirschmuller, "Accurate and Efficient Stereo Processing by Semi-Global Matching and Mutual Information," IEEE Computer Science Conference on Computer Vision and Pattern Recognition, Vol. 2, Jun. 20-25, 2005, pp. 807-814 (Hirschmuller herein) and H. Hirschmuller, "Stereo Processing by Semi-Global Matching and Mutual Information," IEEE Transactions on Pattern Analysis and Machine Intelligence, Vol. 30, No. 2, February 2008, pp. 328-341 (Hirschmuller 2008 herein), which are incorporated by reference herein. This technique provides results that are qualitatively comparable to global matching techniques with reduced computational complexity.

BRIEF DESCRIPTION OF THE DRAWINGS

For a detailed description of various examples, reference will now be made to the accompanying drawings in which.

DETAILED DESCRIPTION

Figure 1:
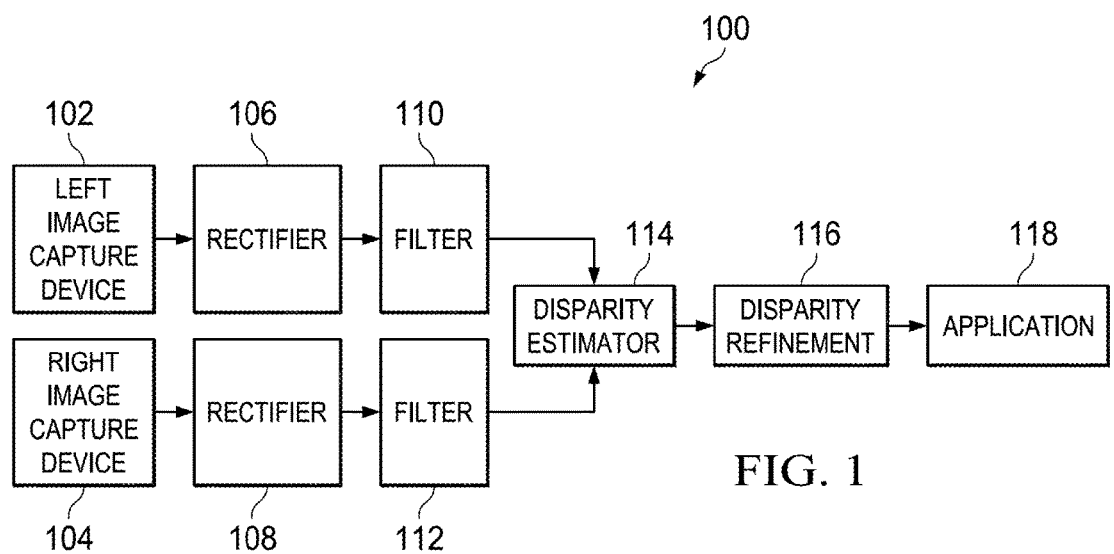
FIG. 1 shows a block diagram of a stereo image processing system in accordance with various examples.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct wired or wireless connection. Thus, if a first device couples to a second device, that connection may be through a direct connection or through an indirect connection via other devices and connections.

As previously mentioned, the semi-global matching (SGM) technique of Hirschmuller may be used for disparity determination in stereo vision applications. In general, in SGM matching costs are computed for each possible disparity at each pixel in a stereo image. Then, for each pixel and disparity, a pathwise aggregation of the matching costs is performed along several paths from the edges of the image to the pixel. Each pathwise cost computation represents the cost for reaching the pixel for a given disparity. The number of paths used may vary. Hirschmuller suggests that a minimum of eight paths is needed and that sixteen paths should be used. For each pixel and each disparity, the pathwise costs (i.e., the costs along the various paths) are summed to generate an aggregated cost for each disparity for the pixel. Then, for each pixel the disparity with the smallest aggregated cost is selected to form a disparity image.

More formally, a matching cost $C(p,d)$, also referred to as a dissimilarity cost or a similarity cost, is computed for each pixel p in a base image for each of multiple possible disparities d of a stereo image and a corresponding pixel in a matching image of the stereo image. The matching cost measures the dissimilarity between corresponding pixels in the left and right images of the stereo images. For computation of the matching cost, one of the left and right images is used as the base image and the other is used as the match image. Hirschmuller suggests using a cost function based on absolute minimum difference in intensities or mutual information (MI). These cost functions are described in Hirschmuller.

The matching costs for each pixel p (for each disparity d) are aggregated along several one-dimensional paths across the image to compute a path matching cost for each disparity. The range of possible disparities d include 0 to D (i.e., 0, 1, 2, etc.). The paths are projected as straight lines across the base image from a pixel at the edge of the image to the pixel p. The path matching cost $L_r(p,d)$ for a path r may be computed recursively as per Eq. 1 below:

$$L_r(p,d) = C(p,d) + \min[L_r(p-r,d), L_r(p-r,d-1)+P_1, L_r(p-r,d+1)+P_1, \min_i L_r(p-r,i)+P_2] - \min_k L_r(p-r,k) \quad (1)$$

where "p-r" indexes to the previous pixel along aggregation path r. For each path r, the computation begins with the pixel at the edge of the image and ends with the pixel p. The first term of Eq. 1 ($C(p,d)$) is the local matching cost of a pixel in the path r. The second term adds the lowest cost of the previous pixel p-r in the path r including a penalty $P_1$ for disparity changes and a penalty $P_2$ for disparity continuities. The penalty $P_1$ is an empirically determined constant and the penalty $P_2$ is adapted to the image content. The last term prevents constantly increasing path matching costs by subtracting the minimum path matching cost of the previous pixel from the whole term.

The aggregated cost $S(p,d)$ for each pixel at each disparity is computed as the sum of the path matching costs for the disparity as per Eq. 2.

$$S(p,d) = \Sigma_r L_r(p,d) \quad (2)$$

The disparity image Db corresponding to the base image is determined by selecting for each pixel p the disparity d yielding the minimum cost, i.e., $\min_d S(p,d)$.

While SGM provides robust results due to cost computations across the entire image, these cost computations result in high memory bandwidth for storing of intermediate results such as matching costs and path matching costs for all pixels/disparities in an image, and irregular data access patterns. Also, a large amount memory is needed. This creates challenges for embedded system and other implementations. The amount of memory needed may be too large to be cost effectively provided as on-chip memory. Off-chip memory such as dynamic random access memory (DRAM) may be used to solve the capacity issue but the available bandwidth and sequential access patterns of off-chip memory may limit throughput. The throughput may be particularly limited when the access pattern is irregular such as that for cost aggregation in SGM in which pixels are traversed in horizontal, vertical, and diagonal directions. Further, frequent accesses to off-chip memory increase power consumption.

The disclosed embodiments address these issues by decomposing the stereo image into parallelogram blocks of pixels for partial path matching costs calculations in a forward pass direction and rectangular tiles of pixels for partial path matching cost calculations in a reverse pass direction. Further, the calculation of the parallelogram blocks is interleaved with the calculation of the rectangular tiles. Within each parallelogram block, the pixels are raster scanned from left to right and from top to bottom in the forward pass direction. Aggregation paths are not limited for the parallelogram blocks. For each rectangular tile interleaved between parallelogram blocks, the pixels are processed from right to left and from bottom to top in the reverse pass direction. Path lengths are limited and overlap borders are added to extend aggregation paths. The disparity result is generated for pixels for which both the forward and reverse aggregations are complete. The memory used by these pixels then can be released. As a result, the embodiments described herein reduce the memory capacity needs of the system as less intermediate path matching cost data need be stored.

FIG. 1 is a block diagram of a stereo image processing system 100. The system 100 includes left and right image capture devices (e.g., cameras, charge coupled device, etc.) 102, 104, two rectifiers 106, 108, two filters 110, 112, a disparity estimator 114, a disparity refinement component 116, and an application component 118. The components of the stereo image processing system 100 may be implemented in discrete logic, application specific integrated circuits (ASICs), field-programmable gate arrays (FPGAs), or software or firmware executing on a processor such as, for example, one or more digital signal processors (DSPs), microprocessors. Further, machine executable instructions may be stored in memory and executed by one or more processors.

The left and right image capture devices 102, 104 include imaging sensor systems configured to capture image signals of a scene from a left viewpoint and a right viewpoint. That is, the imaging sensor system of the left image capture device 102 is arranged to capture an image signal from the left viewpoint, i.e., a left analog image signal, and the imaging sensor system of the right image capture device 104 is arranged to capture an image signal from the right view point, i.e., a right analog image signal. In some embodiments, each of the imaging sensor systems may include a lens assembly, a lens actuator, an aperture, and an imaging sensor. The imaging capture devices 102, 104 also may include circuitry for controlling various aspects of the operation of the respective image sensor systems, such as, for example, aperture opening amount, exposure time, etc. The imaging capture devices 102, 104 also include functionality to convert the respective left and right analog image signals to left and right digital image signals, and to provide the left and right digital image signals to the respective rectifiers 106, 108.

The rectifiers 106, 108 process the respective left and right digital images to align the epipolar lines to be parallel with the scan lines of the images. This rectification is performed to compensate for camera distortions such as lens distortion, sensor tilting, and offset from the focal axis and for image planes that are not co-planar and/or not row aligned as the result of a non-ideal camera pair set up. Any suitable rectification techniques may be used, such as, e.g., bilinear interpolation or spline interpolation. The particular rectification processing performed may depend on the application 118 using the stereo images.

The filters 110, 112 filter the respective rectified left and right images to improve the images for the stereo matching process performed by the disparity estimator 114. The filtering performed may, for example, filter out the low frequency image signal that tends to capture undesired illumination and exposure differences between the cameras, amplify the high frequency texture of the scene, and reduce the effects of image sensor noise. Any suitable filter or filters may be used. For example, the Laplacian-of-Gaussian (LoG) filter described in D. Marr and E. Hildreth, "Theory of Edge Detection," Proceedings of the Royal Society of London, Series B, Biological Sciences, Vol. 207, No. 1167, Feb. 29, 1980, pp. 187-217, may be used or variants and approximations thereof as described in S. Pei and J. Horng, "Design of FIR Bilevel Laplacian-of-Gaussian Filter," Signal Processing, No. 82, Elsevier Science B.V., 2002, pp. 677-691.

The disparity estimator 114 receives the rectified, filtered left and right images and generates a disparity image of the stereo image. As part of the processing performed to generate the disparity image, the disparity estimator 114 may perform the path cost calculations as described herein for the forward pass parallelogram blocks and reverse pass rectangular tiles. The operation of the disparity estimator 114 is described in more detail with reference to FIG. 2.

The disparity refinement component 116 performs processing to refine the disparity image as it is expected that some part of the disparity image may be incorrect. Any suitable refinement technique or techniques may be used. For example, a disparity confidence measure such as the one described in F. Mroz and T. Breckon, "An Empirical Comparison of Real-Time Dense Stereo Approaches for Use in the Automotive Environment," EURASIP Journal on Image and Video Processing, Aug. 16, 2012, pp. 1-40, may be utilized to identify and correct such regions. In another example, a median filter with a small window, e.g., 3×3, may be applied to smooth and remove irregularities such as outliers and peaks. In another example, interpolation may be performed to remove small holes in the disparity image. In another example, sub-pixel interpolation may be performed to increase the accuracy of the disparity image. Some suitable disparity refinement techniques that may be used are described in Hirschmuller 2008.

The application component 118 receives the disparity image and performs any additional processing needed for the particular application. The application component 118 may implement any application or applications that rely on a three-dimensional (3D) representation of a scene. For example, the application component 118 (which may execute on a processor) may be an automotive forward collision warning application that computes a distance from the vehicle to an object acquired in the images and, tracks the object over time to determine if the vehicle is rapidly approaching it, and warns the driver of an impending collision. In another example, the application component 118 may be an automotive pedestrian detection application. In another example, the application component 118 may be a 3D video conference call application that supports background replacement. In another example, the application component 118 may be a 3D person tracking application.

Figure 2:
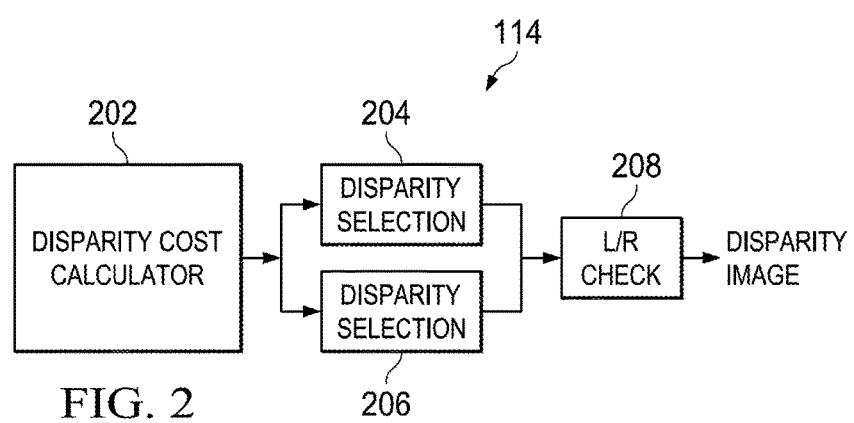
FIG. 2 is a block diagram of a disparity estimator usable in the stereo image processing system in accordance with various examples.

FIG. 2 is a block diagram of an example of the disparity estimator 114 of FIG. 1. The disparity estimator 114 includes a disparity cost calculation component 202, left and right disparity selection components 204, 206, and a left/right (L/R) check component 208. The disparity cost calculation component 202 performs a method for processing pixels in forward pass parallelogram blocks interleaved with reverse pass rectangular tiles to generate left and right aggregated disparity costs from the left and right rectified, filtered images. This method is described in detail below. The method may be performed twice, once with the left image as the base image and the right image as the match image to generate the left aggregated disparity costs, and once with the right image as the base image and the left image as the match image to generate the right aggregated disparity costs.

The left and right disparity selection components 204, 206 receive the respective left and right aggregated disparity costs and may generate, respectively, a left disparity image and a right disparity image. As is explained in more detail herein, the left aggregated disparity costs include multiple aggregated disparity costs per pixel position in the stereo image, one per each disparity considered. The same is true of the right aggregated disparity costs. The left disparity selection component 204 generates the left disparity image by selecting for each pixel position p the disparity d having the minimum aggregated cost of the left aggregated disparity costs, i.e., $\min_d S(p,d)$. The right disparity selection component 206 similarly generates the right disparity image from the right aggregated disparity costs. Any suitable search strategy may be used to locate the disparity with the minimum aggregated cost for a pixel location. For example, a Fibonacci sequence with a suitable starting value may be used. The suitable starting value may be, for example, a predetermined value, a random guess, or the disparity selected for the same pixel location in the previous stereo image.

The L/R check component 208 generates a single disparity image from the left and right disparity images. In general, the L/R check component 208 performs a consistency check to determine occlusions and false matches based on the assumption that any point in the left image has a single match in the right image. As shown in Eq. 3 below, to generate the single disparity image, each disparity $D_{pb}$ at each pixel location p of the left disparity image is compared with its corresponding disparity $D_{mq}$ in the right disparity image. In some embodiments, if the absolute value of the difference between the two disparities is less than or equal to 1, the pixel location in the single disparity image is set to the disparity $D_{pb}$; otherwise, the pixel location is marked as invalid. The result is that occlusions are removed without affecting the valid matches.

$$D_p = \begin{cases} D_{bp} & \text{if } |D_{bp} - D_{mq}| \leq 1 \\ D_{inv} & \text{otherwise} \end{cases} \quad (3)$$

Figure 3:
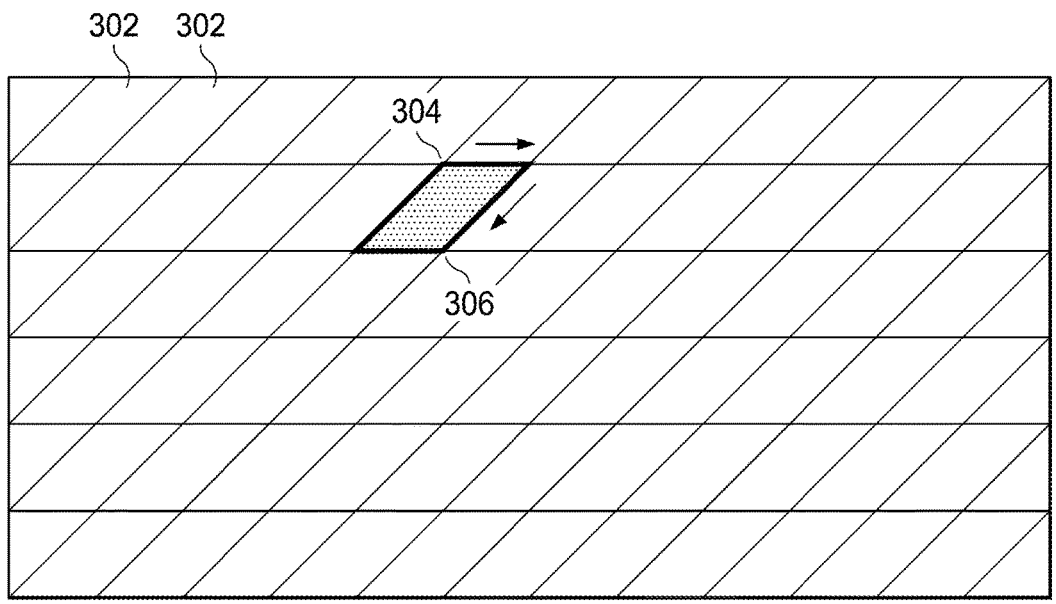
FIG. 3 illustrates an image decomposed into parallelogram blocks in which pixels are processed in a forward pass direction in accordance with various examples.

FIG. 3 illustrates an image (left or right) that has been decomposed into a plurality of parallelogram blocks 302. Each parallelogram block includes opposite sides that are parallel. As used herein, a parallelogram has opposite sides that are parallel but whose corners are not right angles. Thus, parallelograms do not include rectangles as these terms are used herein. The pixels of the image are processed to compute aggregated costs for each possible disparity for each pixel generally starting from the upper left corner of the image and progressing left to right and top to bottom. However, the pixels of each parallelogram block are processed in a forward pass direction before continuing with the pixels of the next adjacent parallelogram block, and the parallelogram blocks are processed from left to right and top to bottom. Within each parallelogram block, partial path matching costs are computed for the pixels of that block from the top left corner 304 to the bottom right corner 306 as illustrated for the shaded parallelogram block. The pixels thus are processed from left to right and top to bottom as indicated by the arrows.

In some embodiments, for each pixel in this forward pass direction, the partial path matching costs are computed using the path directions: left to right horizontal (→), upper left to lower right diagonal (↘), top to bottom vertical (↓), and upper right to lower left diagonal (↙). Along each of these four directions, the disparity estimator 114 computes a path matching cost using Eq. (1) above. The use of parallelograms is helpful in order to accommodate these path directions particularly the upper right to lower left diagonal direction. In some embodiments, the angle of each parallelogram side approximately equals to the angle of the upper right to lower left diagonal thereby permitting all of the pixels from the top or side edges of the image to be traversed through previously computed parallelograms to the parallelogram being processed.

Figure 4:
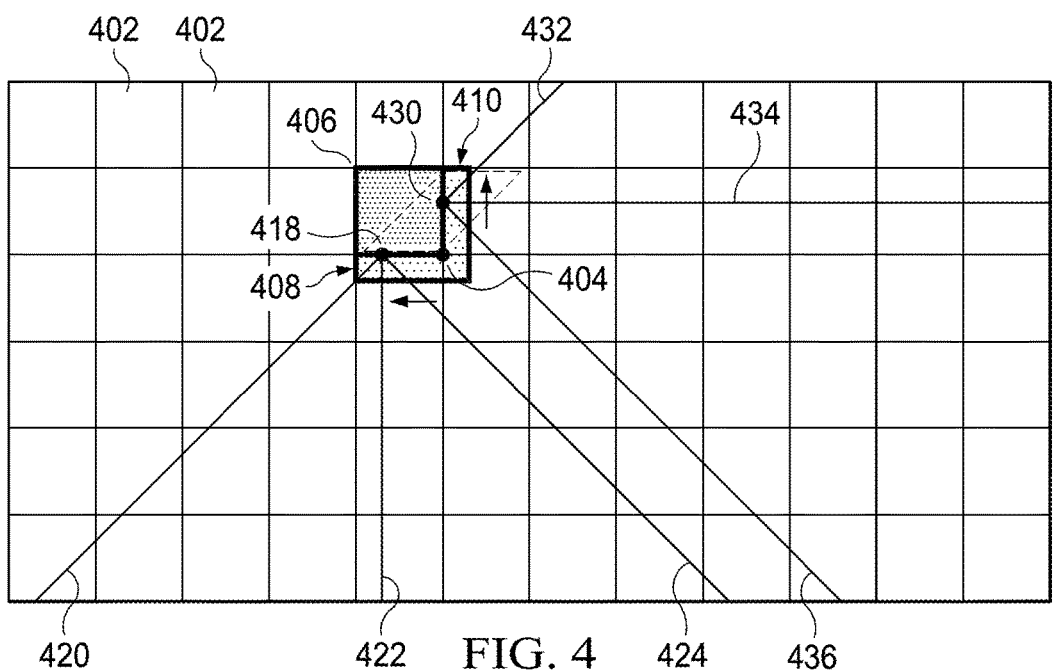
FIG. 4 illustrates an image decomposed into rectangular tiles in which pixels are processed in a forward pass direction in accordance with various examples.

Once the partial path matching costs are computed for the four directions listed above for the pixels of a given parallelogram block, the disparity estimator then computes the partial path matching costs of a rectangular tile that partially overlaps the pixels of the parallelogram block. FIG. 4 illustrates the same image as in FIG. 3 but the pixels have been decomposed into rectangular tiles 402. Each tile is rectangular in shape, and may comprise a square. The partial path matching costs for the pixels in each rectangular tile 402 are computed along the four directions right to left horizontal (←), lower right to upper left diagonal (↖), bottom to top vertical (↑), and lower left to upper right (↗). Along each of these four directions, the disparity estimator 114 computes a path matching cost using Eq. 1 above. Within each rectangular tile 402, the path matching costs are computed for the pixels beginning at the lower right corner 404 and progressing right to left and bottom to top until culminating with pixel in the upper left corner 406.

For the pixels in the backward pass of each rectangular tile 402, the path lengths are limited and overlap borders 408 and 410 are added to extend the aggregation paths. The overlap border 408 is along the bottom edge of the tile 402 and the overlap border 410 is along the right edge of the tile. Path cost aggregation values along the lower right to upper left diagonal (↖) are generated and saved in memory when processing the rectangular tile immediately to the left. The aggregation paths for each rectangular tile 402 are computed for the boundary pixels along the bottom and right edges of the tile using Eq. (1). An example pixel 418 is illustrated along the bottom edge. Three extended aggregation paths 420, 422, and 424 are shown along which path matching costs are computed for pixel 418. Extended paths are determined for each pixel along the bottom edge and path matching costs are computed for each such pixel and stored in memory to be used for those pixels and for pixels internal to the rectangular tile along the extension paths. The path matching costs for the pixels along the right edge are similarly computed but their extension paths are upper right to lower left, right to left and lower right to upper left as shown for example pixel 430 and extension paths 432, 434, and 436. Such extension paths for the boundary edge pixels are not need for the forward pass direction of the parallelogram blocks.

For a given pixel, four partial path matching costs are computed in the forward direction (left to right, upper left to bottom right, top to bottom, and upper right to lower left) for each possible disparity when processing the pixels of the parallelogram block. For that same pixel, four partial path matching costs also are computed in the reverse direction (lower left to upper right, bottom to top, lower right to upper left, and right to left) for each possible disparity when processing the pixels of the rectangular tile that includes the pixel. Once these eight partial matching costs are computed, the disparity estimator 114 then can compute the total aggregated cost S(p,d) for each such pixel at each disparity using Eq. (2) above.

FIGS. 5A-5G illustrate the interleave process by which the partial path matching costs for the pixels of the parallelogram blocks 302 and rectangular tiles 402 are computed. That, is a parallelogram block is processed followed by a rectangular tile followed by the next parallelogram block followed by the next rectangular tile, and so on. The blocks and tiles are processed from the upper left corner of the image to the bottom right corner from left to right and from top to bottom. However, the pixels within the parallelogram blocks are processed in a forward pass direction, whereas the pixels within the rectangular blocks are processed in a reverse pass direction as explained above.

The horizontal cross-hatching in FIGS. 5A-5G denotes forward pass path matching cost calculations of pixels within a parallelogram block. The vertical cross-hatching denotes reverse pass path matching cost calculations of pixels within a rectangular tile. In regions where the pixels have had path matching costs computed in both directions as part of both a parallelogram block and a rectangular tile, the cross-hatching is mix of horizontal and vertical.

Figure 5A:
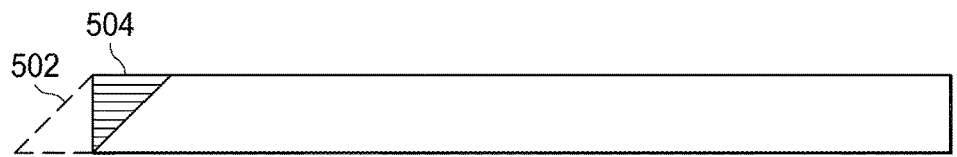
FIGS. 5A-5G illustrate a sequence of processing steps for interleaving parallelogram blocks and rectangular tiles in accordance with various examples.

FIGS. 5A-5G illustrate a time sequence of events. FIG. 5A illustrates a parallelogram block 502 with forward pass path matching costs computed for its pixels as explained above. The dashed outline of a portion of the parallelogram is shown but the partial path matching costs of the pixels within the dashed outline have been removed from memory as no longer necessary. The partial path matching costs of the pixels within the right portion 504 of the parallelogram block 502 are stored in memory.

Figure 5B:
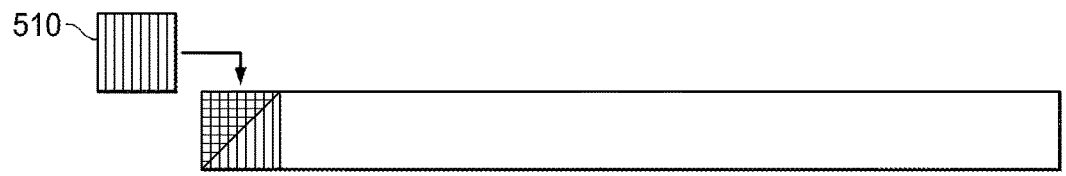

FIG. 5B illustrates that the disparity estimator 114 has computed path matching costs for pixels within a rectangular tile 510. As can be seen, half of the pixels of the rectangular tile overlap the pixels of the right portion 504 of the parallelogram block. At this point, the pixels within the right portion 504 of the parallelogram block have had all relevant path matching costs computed during both the forward pass and the reverse and thus the total aggregated cost for each of those pixels can be calculated by the disparity estimator.

Figure 5C:
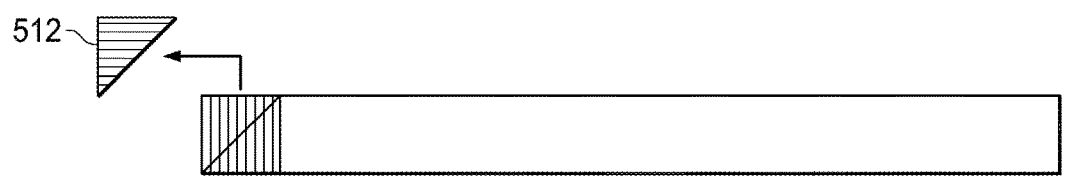
Figure 5D:
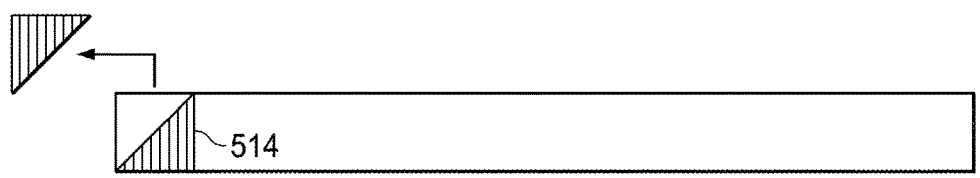

Once the total aggregated costs for the pixels of the right portion 504 of the parallelogram block have been computed, then the path matching costs of the pixels of the upper left triangular region 512 of the rectangular tile (which corresponded to the right portion 504 of the parallelogram block) can be deleted from memory as no longer being needed. FIG. 5C graphically illustrates the deletion of this patch matching cost data. Similarly, FIG. 5D illustrates that the path matching costs of the pixels of the right portion 504 of the parallelogram block also can be removed from memory as no longer being necessary. What is left is the path matching cost of pixels in the lower right triangular region 514 of the rectangular tile 510.

Figure 5E:
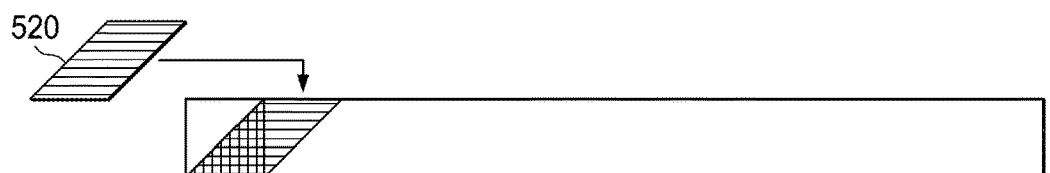
Figure 5F:
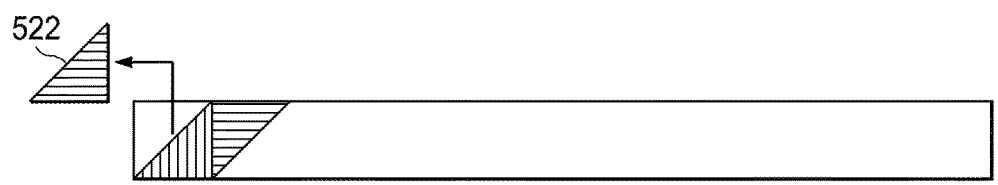
Figure 5G:
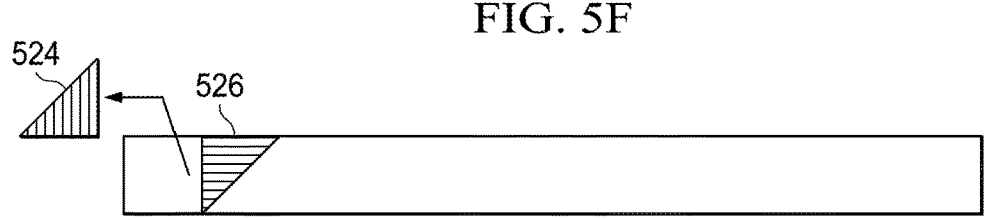

FIG. 5E then illustrates the computation of the path matching costs of the pixels in the next parallelogram block 520 which is shown superimposed on the remaining pixels of the previous rectangular tile 510. As can be seen in FIG. 5E, the disparity estimator 114 has computed all relevant path matching costs for the pixels of the lower right triangular region 514 of the rectangular tile 510 (which also include the path matching costs computed for the new parallelogram block 520). At this point, the disparity estimator 114 can compute the total aggregated cost of the pixels of the lower right triangular region 514 of the rectangular tile 510. With the total aggregated cost of the pixels in triangular region 514 computed then, as shown in FIGS. 5F and 5G, the partial path matching cost of the left side triangle 522 of parallelogram block 520 and the partial path matching cost of the lower right triangular region 514 of the rectangular tile 510 can be removed from memory. What is left in memory is the partial match matching cost of the pixels within the right side triangle 526 of the parallelogram block 520, which generally corresponds to the initial state depicted in FIG. 5A. The process then repeats.

Figure 6:
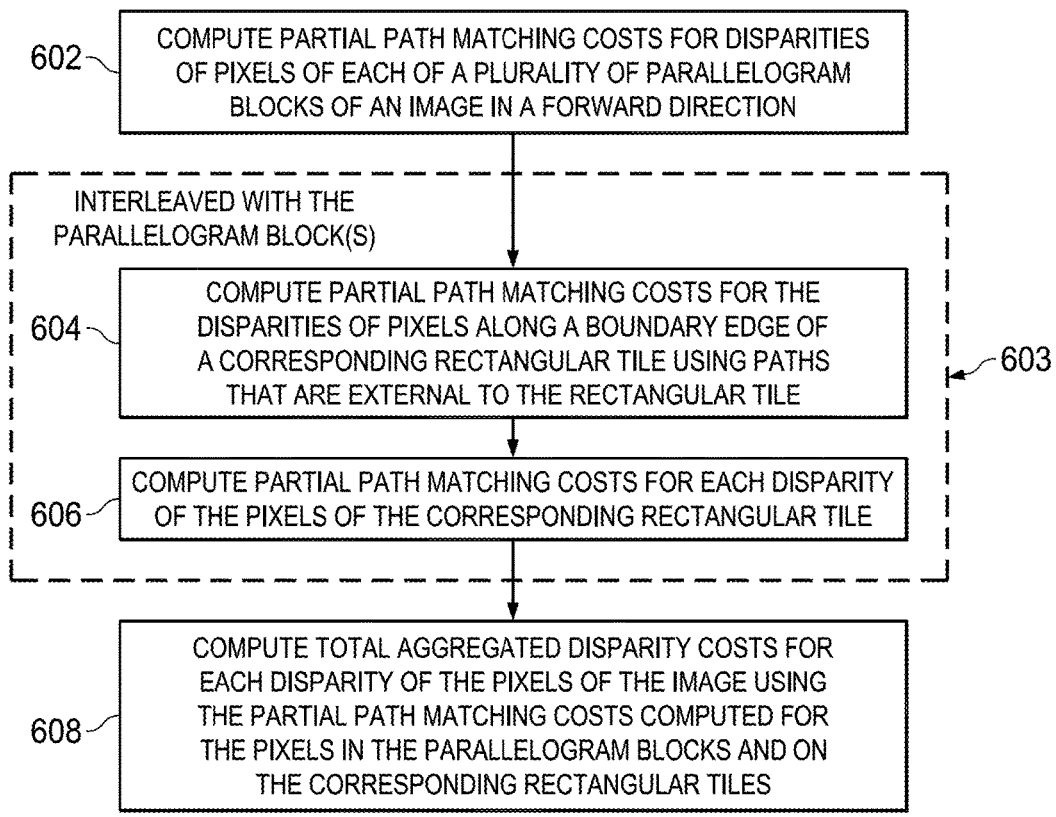
FIG. 6 shows a method flow chart in accordance with various examples.

FIG. 6 shows a method in accordance with various embodiments. The various operations shown may be performed by the disparity estimator 114. At 602, the method includes computing partial path matching costs for a plurality of disparities of pixels of each of a plurality of parallelogram blocks of an image in a forward pass direction. The forward direction refers to computing path costs starting at the upper left corner of each parallelogram block and continuing from left to right and top to bottom.

Interleaved with the processing of each parallelogram and as indicated by the dashed box 603 in FIG. 6 are operations 604 and 606. Operation 604 includes computing partial path matching costs for the plurality of disparities of pixels along a boundary edge of a corresponding rectangular tile using paths that are external to the rectangular tile. In some embodiments such as that discussed above, the computation of the partial path matching costs for the disparities of boundary edge pixels includes performing such computations along two boundaries (e.g., bottom and right). Operation 606 includes computing partial path matching costs the disparities for all of the pixels of the corresponding rectangular tile. Such computations will include using at least some of the boundary edge pixel path costs computed at 604.

Operation 608 includes computing total aggregated disparity costs for each disparity of the pixels of the image using the partial path matching costs computed for the pixels in the parallelogram blocks and in the rectangular tiles.

Figure 7:
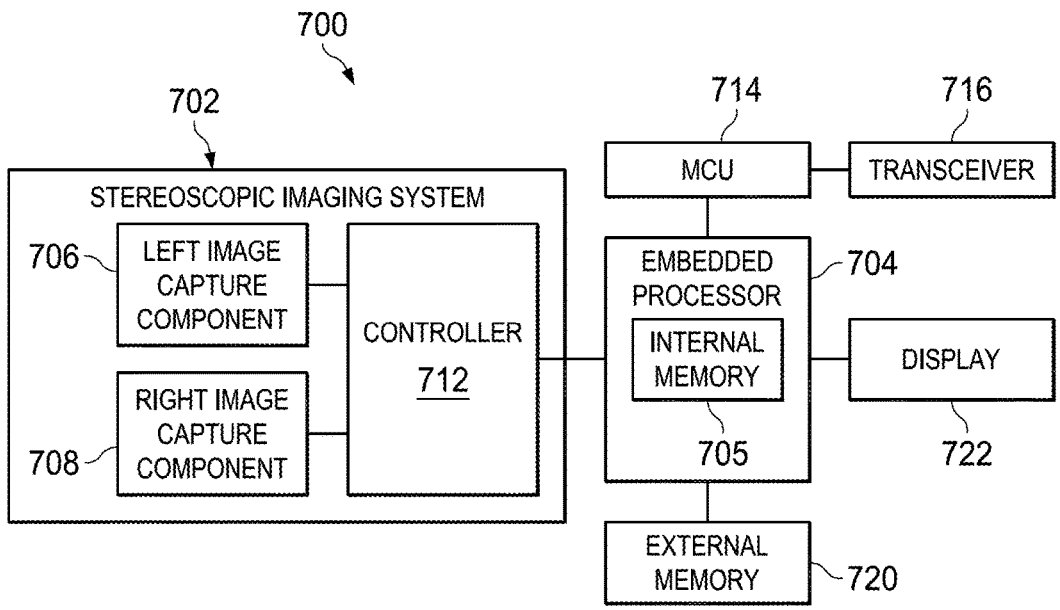
FIG. 7 is a block diagram of an automotive vision control system in accordance with an example.

FIG. 7 is a block diagram of an embedded automotive vision control system 700 suitable for use in a vehicle that may be configured to generate disparity images using the hybrid tiling technique described herein. The stereoscopic imaging system 702 includes left and right capture components 706, 708 and a controller component 712 for capturing the data needed to generate a stereoscopic video sequence. The imaging components 706, 708 may be imaging sensor systems (e.g., cameras) arranged to capture image signals of a scene from a left viewpoint and a right viewpoint. That is, the imaging sensor system in the left imaging component 706 may be arranged to capture an image signal from the left viewpoint, i.e., a left analog image signal, and the imaging sensor system in the right imaging component 708 may be arranged to capture an image signal from the right view point, i.e., a right analog image signal. Each of the imaging sensor systems includes a lens assembly, a lens actuator, an aperture, and an imaging sensor. The stereoscopic imaging system 702 also may include circuitry for controlling various aspects of the operation of the system, such as, for example, aperture opening amount, exposure time, etc. The controller module 712 includes functionality to convey control information from the embedded processor 704 to the imaging sensor systems 706, 708, to convert the left and right analog image signals to left and right digital image signals, and to provide the left and right digital image signals to the embedded processor 704 for further processing.

Software instructions implementing the functionality of the rectification, filtering, disparity estimation, and disparity refinement components of FIG. 1 (when executed by a processor) may be stored in the external memory 720 and executed by the embedded processor to generate disparity images for the stereoscopic images received from the stereoscopic imaging system 702. Software instructions implementing a driver assistance application needing 3D vision information such as forward collision warning, visual parking and/or navigation assistance, automatic braking control, etc., may also be stored in the external memory 720 and executed on the embedded processor. The software instructions may be initially stored in a non-transitory storage device and loaded and executed by the embedded processor 704. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage devices such as read-only memory devices, writable storage media such as disks, flash memory, random access memory, or a combination thereof.

The embedded processor 704 may be any suitable processor that provides the computation performance needed for stereo vision processing, such as, for example, a digital signal processor or a general purpose processor. The internal memory 705 may be any suitable memory design, e.g., static random access memory (SRAM). The embedded processor 704 includes functionality to move instructions and/or data between the external memory 720 and the internal memory 705 as needed for stereo image processing, e.g., generation of disparity images, and application processing.

The external memory 720 may be any suitable memory design may be used. For example, the external memory 720 may include DRAM such as synchronous DRAM (SDRAM) or double data rate DRAM (DDR DRAM), flash memory, a combination thereof, or the like.

The display 722 may be a display device capable of displaying stereo images or a display device capable of displaying two-dimensional images. In the latter case, images captured by one of the image capture devices 102, 104 are displayed on the display 722. The information provided on the display depends on the particular application or applications of the system 700. For example, the display 722 may be used by a parking assistance application executing in a vehicle.

The microcontroller (MCU) 714 may be a general purpose microcontroller configured to handle system control functions such as stepper motors in real time as well as communication with other modules in the vehicle such as through a transceiver 716. In some embodiments, transceiver 716 provides a network protocol for serial communication with various control modules in the vehicle.

In operation, the embedded processor 704 may receive a sequence of left and right digital images of a stereo video sequence from the stereoscopic imaging system 702, execute software instructions stored in the external memory 720 or internal memory 705 to perform rectification, filtering, disparity estimation, and disparity refinement as previously described herein to generate a disparity images, and provide the disparity images to one or more driver assistance applications. In some embodiments, the left and right images may be stored in the external memory 720 and portions of the images are read into the internal memory 705 as needed for the generation of the disparity images.

A driver assistance application may further process the disparity images to provide vision based assistance to a driver. For example, the driver assistance application may derive information about the scene from the disparity images that allows it to detect that a collision with an object is imminent. The driver assistance application may then communicate with the MCU 714 to request that the MCU 714 interact with a brake control module to slow the vehicle down and may also cause a visual alarm to be displayed on scene shown in the display 722 and/or cause an audible alarm to be initiated.

As part of the generation of the disparity images, an embodiment of the technique described herein may be implemented as machine instructions executing the embedded processor 704. For the partial path cost computations, the embedded processor 704 may divide the base image into parallelogram blocks for forward pass direction processing and rectangular tiles for reverse pass direction processing. The size of the blocks and tiles (in terms of pixels) may be an appropriate size that permits a tile and some or all of the intermediate results of computing the aggregated disparity costs to be retained in the internal memory 705 while the aggregated disparity costs are generated.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for disparity cost computation for a stereoscopic image, comprising:
    computing partial path matching costs for a plurality of disparities of pixels of each of a plurality of parallelogram blocks of an image in a forward pass direction;
    between computing the partial path matching costs of the pixels of adjacent parallelogram blocks, computing partial path matching costs for the plurality of disparities of pixels along a boundary edge of a corresponding rectangular tile using paths that are external to the rectangular tile and computing partial path matching costs the disparities for all of the pixels of the corresponding rectangular tile; and
    computing total aggregated disparity costs for each disparity of the pixels of the image using the partial path matching costs computed for the pixels in the parallelogram blocks and in the rectangular tiles.

2. The method of claim 1, wherein computing partial path matching costs for a plurality of disparities of pixels along a boundary edge of the corresponding rectangular tile comprises computing partial path matching costs for a plurality of disparities of pixels along two boundary edges of the corresponding rectangular tile.

3. The system of claim 2, wherein the two boundary edges are the bottom edge and the right edge of the rectangular tile.

4. The method of claim 1, wherein each rectangular tile partially overlaps a corresponding parallelogram block.

5. The method of claim 1,
wherein computing the partial path matching costs for pixels of each parallelogram block includes computing the partial path matching costs for pixels starting at the top and on left and progressing left to right and top to bottom; and
wherein computing the partial path matching costs for the disparities of the pixels of the corresponding rectangular tile includes computing the partial path matching costs for pixels within the rectangular tile starting the lower right corner and progressing right to left and bottom to top.

6. The method of claim 1, further comprising storing path matching costs computed for pixels along the boundary edge.

7. The method of claim 1, wherein computing the partial path matching costs for pixels of each of the plurality of parallelogram blocks comprises using paths that do not include external paths through other parallelogram blocks whose pixel path matching costs have not yet been computed.

8. A stereo image processing system, comprising:
a first image capture device;
a second image capture device; and
a disparity estimator configured to:
  receive images produced by the first and second image capture devices and to decompose each image into a plurality of parallelogram blocks and a plurality of rectangular tiles;
  compute partial path matching costs for a plurality of disparities of pixels of each parallelogram block in a forward pass direction;
  compute partial path matching costs for the plurality of disparities for the pixels of each rectangular tile in a reverse pass direction, wherein the computation for the pixels of the rectangular tiles are interleaved with the computation for the pixels of the parallelogram blocks; and
  computing total aggregated disparity costs for each disparity of the pixels of the image using the partial path matching costs computed for the pixels in the parallelogram blocks and in the rectangular tiles.

9. The stereo image processing system of claim 8, wherein the disparity estimator is further configured to compute partial path matching costs for the plurality of disparities of pixels along a boundary edge of a rectangular tile using paths that are external to the rectangular tile.

10. The stereo image processing system of claim 9, wherein the disparity estimator is configured to store path matching costs computed for pixels along the boundary edge.

11. The stereo image processing system of claim 9, wherein the disparity estimator is configured to compute the partial path matching costs for a plurality of disparities of pixels along the boundary edge of the rectangular tile through computation of partial path matching costs for a plurality of disparities of pixels along two boundary edges of the corresponding rectangular tile.

12. The stereo image processing system of claim 11, wherein the two boundary edges are the bottom edge and the right edge of the rectangular tile.

13. The stereo image processing system of claim 8, wherein the disparity estimator is configured to decompose each image into parallelogram blocks and rectangular tiles such that each rectangular tile partially overlaps a parallelogram block.

14. The stereo image processing system of claim 8, wherein the disparity estimator comprises discrete logic, an application specific integrated circuit (ASIC), a field-programmable gate array (FPGA), or software or firmware executing on a processor.

15. The stereo image processing system of claim 8, wherein the disparity estimator is configured to:
compute the partial path matching costs for the plurality of disparities for pixels of each parallelogram block through computation of the partial path matching costs for the plurality of disparities for pixels starting at the upper left corner of the parallelogram block and progressing left to right and top to bottom until a bottom right pixel is reached; and
compute the partial path matching costs for the plurality of disparities for the pixels within each rectangular tile starting at the lower right corner of the rectangular tile and progressing right to left and bottom to top.

16. The stereo image processing system of claim 8, wherein the disparity estimator is configured to compute the partial path matching costs for pixels of each of the plurality of parallelogram blocks using paths that do not include external paths through other parallelogram blocks whose pixel path matching costs have not yet been computed.

17. The stereo image processing system of claim 8 further including an application executing on a processor that is configured to generate an alert in a vehicle based on a distance value computed to an object in the images.

18. A non-transitory storage device containing machine instructions which, when executed by a processing resource, causes the processing resource to:
compute partial path matching costs for a plurality of disparities of pixels of each of a plurality of parallelogram blocks of an image in a forward pass direction;
between computing the partial path matching costs of the pixels of adjacent parallelogram blocks, compute partial path matching costs for the plurality of disparities of pixels along a boundary edge of a corresponding rectangular tile using paths that are external to the rectangular tile and compute partial path matching costs the disparities for all of the pixels of the corresponding rectangular tile; and
compute total aggregated disparity costs for each disparity of the pixels of the image using the partial path matching costs computed for the pixels in the parallelogram blocks and in the rectangular tiles.

19. The non-transitory storage device of claim 18, wherein each rectangular tile partially overlaps a corresponding parallelogram block.

20. The non-transitory storage device of claim 18, wherein, when executed, the machine instructions further cause the processing resource to store path matching costs computed for pixels along the boundary edge.

* * * * *